(12) United States Patent
Yost et al.

(10) Patent No.: US 9,972,035 B2
(45) Date of Patent: *May 15, 2018

(54) SYSTEM AND METHOD FOR DEVICE VALUATION

(71) Applicant: Visa International Service Association, San Francisco, CA (US)

(72) Inventors: Robert Yost, San Francisco, CA (US); Yaasha Sabba, San Jose, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/483,562

(22) Filed: Apr. 10, 2017

(65) Prior Publication Data
US 2017/0236172 A1    Aug. 17, 2017

Related U.S. Application Data

(63) Continuation of application No. 15/043,222, filed on Feb. 12, 2016, now Pat. No. 9,672,543.

(51) Int. Cl.
*H04B 17/00* (2015.01)
*G06Q 30/02* (2012.01)

(52) U.S. Cl.
CPC .............................. *G06Q 30/0283* (2013.01)

(58) Field of Classification Search
CPC ......... H04L 1/02; H04L 1/24; G06Q 30/0278; G06Q 30/018
USPC ................... 375/224, 222; 455/67.11, 67.12; 702/182, 186; 705/306
See application file for complete search history.

(56) References Cited

U.S. PATENT DOCUMENTS

| | | | |
|---|---|---|---|
| 6,754,470 B2 | 6/2004 | Hendrickson et al. | |
| 7,493,234 B2 | 2/2009 | Greco et al. | |
| 7,664,617 B2 | 2/2010 | Greco et al. | |
| 2008/0041147 A1 | 2/2008 | David | |
| 2010/0156653 A1* | 6/2010 | Chaudhari ............... | G01C 9/00 340/686.1 |

(Continued)

FOREIGN PATENT DOCUMENTS

| | | |
|---|---|---|
| JP | 2005242801 A2 | 9/2005 |
| KR | 20110061890 A | 2/2009 |

OTHER PUBLICATIONS

PCT International Search Report and Written Opinion dated Apr. 5, 2107 in re PCT Application No. PCT/US2016/066724 filed Dec. 14, 2106, 15 pages.

*Primary Examiner* — Khai Tran
(74) *Attorney, Agent, or Firm* — Kilpatrick Townsend & Stockton LLP

(57) ABSTRACT

Described herein is a platform and method for providing a device valuation for an electronic device based on parameter values of the electronic device. The method may comprise obtaining a model information of the electronic device and identifying a base value of the electronic device. In some embodiments, a device specific performance evaluation may be executed on a hardware component contained with the electronic device. Upon execution of the performance evaluation, a set of parameter values may be generated using input collected with respect to the performance evaluation. A valuation of the electronic device may subsequently be generated based upon the base value and the set of parameter values.

20 Claims, 8 Drawing Sheets

(56) References Cited

U.S. PATENT DOCUMENTS

2012/0198279 A1    8/2012  Schroeder
2015/0066586 A1    3/2015  Teraoka
2015/0356637 A1  12/2015  Graffia

* cited by examiner

SYSTEM AND METHOD FOR DEVICE VALUATION

CROSS-REFERENCES TO RELATED APPLICATIONS

This application is a continuation application of U.S. patent Ser. No. 15/043,222, filed Feb. 12, 2016 entitled SYSTEM AND METHOD FOR DEVICE VALUATION.

BACKGROUND

Consumers purchase and use numerous electronic devices and appliances. With the evolution of the "Internet of Things," these devices are becoming increasingly self-aware and capable of communication using commonly understood networking protocols. However, they are also often "sunk cost" depreciating assets in a typical consumer's home or business, offering little to no value, short of an active effort to manually attempt to sell or otherwise monetize these electronic devices. Even then, in a manual sale offer, the condition of these devices is often difficult to ascertain or verify visually by a prospective buyer. This is the case even when the technical specifications of the device are known, as there is still no way to guarantee that the device is functioning to manufacturing specifications. This functionality (or a lack thereof) would presumably impact the device's resale value.

Additionally, it may be difficult for a user to ascertain the appropriate time to discard or replace an electronic device. For example, the functionality of a particular electronic device may decrease even as newer versions of the device become faster, more resilient, and/or more efficient. It may be difficult to determine whether the cost of replacement for the electronic device is offset by the increased functionality of a new device.

Embodiments of the invention address these and other problems, individually and collectively.

BRIEF SUMMARY

Embodiments of the invention are directed to a platform for generating a device valuation for an electronic device based at least in part on a functionality assessment of the electronic device. In this disclosure, a resident software module may be executed from an execution environment of an electronic device in order to assess the electronic device's performance. A base value may be calculated for the electronic device based on model information. The electronic device's performance is compared to the electronic device's technical specifications and expected performance to calculate an appropriate value from the base value.

One embodiment of the invention is directed to a method comprising receiving a request for a device valuation associated with an electronic device. The method also includes obtaining a model information for the electronic device; and identifying a base value for the electronic device based at least in part on the model information. Then, in response to causing execution of a device-specific performance evaluation upon a hardware component contained within the electronic device, the method includes generating a set of parameter values based upon the execution of said device-specific performance evaluation. Thereafter, an assessment of the electronic device may be generated based at least in part on the generated set of parameter values and the base value.

Another embodiment of the invention is directed to a server computer comprising a processor and computer-readable medium coupled to the processor, where the computer-readable medium comprises code, executable by the processor, for performing a method. The method comprises determining a base value associated with the electronic device and obtaining specification values associated with the electronic device. The method further comprises executing a performance evaluation to obtain one or more parameter values and determining, by comparing the one or more parameter values to the specification values, a value adjustment. The method may comprise generating a device valuation for the electronic device based at least in part on the base value and the value adjustment.

Another embodiment of the invention is directed to a method comprising receiving a request to provide a device valuation and obtaining a model information associated with the electronic device. The method further comprises sending an instruction to the electronic device to initiate a performance evaluation, and in response, receiving a set of parameter values associated with a functionality of the electronic device. The method may then comprise determining, based on the model information, a base value associated with the electronic device and subsequently determining, based at least in part on the received set of parameter values and the base value, the device valuation.

In some embodiments, a valuation may be provided with respect to a difference between the parameter values and expected values for the same or a different electronic device. The valuation may represent a value of upgrading to a newer version of the electronic device or replacing the electronic device. In some embodiments, the valuation may be compared to a valuation generated for the electronic device to determine that the electronic device should be upgraded or replaced.

These and other embodiments of the invention are described in further detail below.

BRIEF DESCRIPTION OF THE DRAWINGS

FIG. 8 depicts aspects of elements that may be present in a computer device and/or system configured to implement a

DETAILED DESCRIPTION

Figure 1:
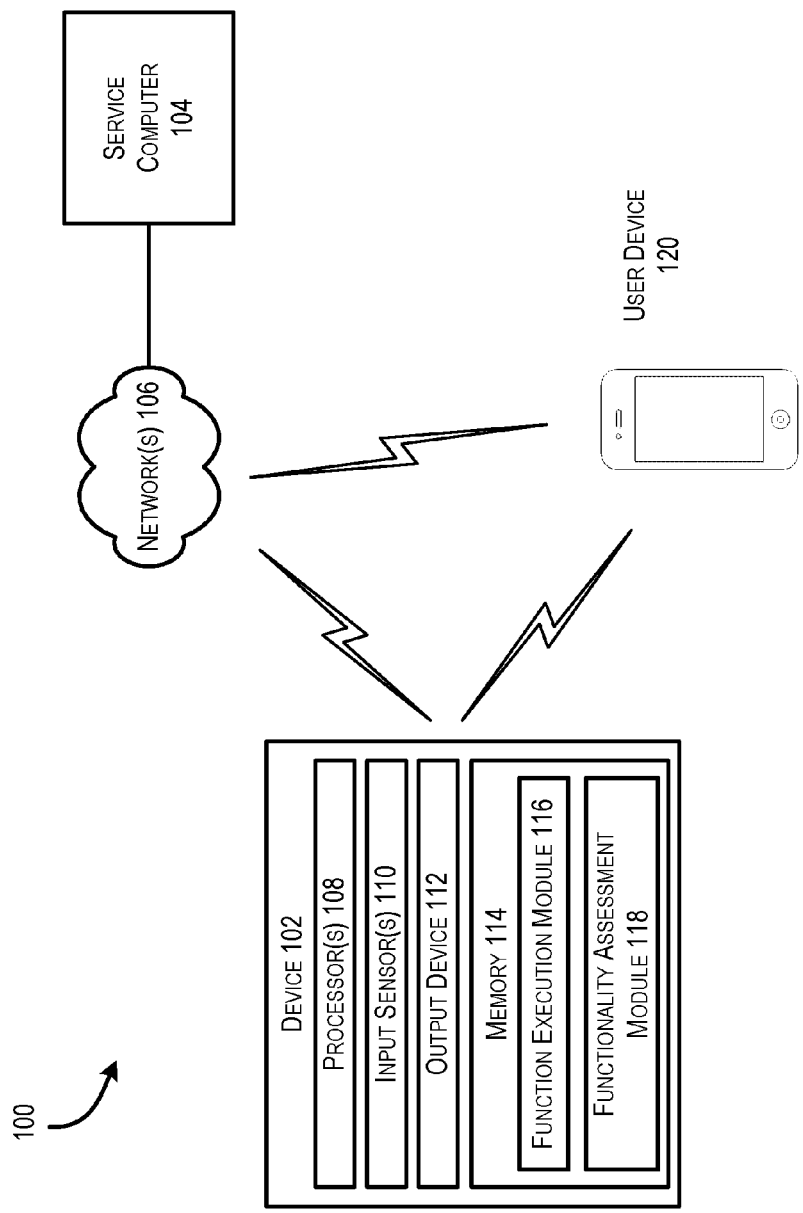
FIG. 1 depicts an illustrative example of a system or architecture in which techniques for implementing a device valuation functionality on an electronic device may be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present invention are directed to systems, methods, apparatuses, and computer readable media for providing a system and method for analyzing the hardware components and the respective performance capabilities of an electronic device, and then attributing a valuation to that electronic device based upon that analysis. This valuation can then be used to monetize that underlying device through transactions like sale or asset secured lending with little to no user intervention. In some embodiments, a resident software module may be executed from a device to execute a performance evaluation on the electronic device and to analyze the electronic device's performance. In some embodiments, model information may be obtained to understand the device's technical specifications and expected performance. The model information may be obtained by a service computer or by the device. In some embodiments, the model information may be used to determine a base value for the electronic device. Upon completion of the performance evaluation, a valuation may be generated for the electronic device based on the base value and the electronic device's performance with respect to its expected performance.

Prior to discussing embodiments of the invention, description of some terms may be helpful in understanding embodiments of the invention.

A "base value" may be a generalized estimation of a value of something. In some embodiments, a base value may include a generalized estimation of the value of an electronic device at a particular point in time. For example, a base value may be an average value associated with a particular model of the electronic device. In another example, the base value may be a maximum value of an electronic device if it is in perfect condition. In this latter example, the base value of an electronic device may be the manufacturer's suggested retail price (MSRP) of an electronic device during its first year being sold. In some embodiments, a base value may be calculated using one or more formulae associated with the electronic device.

A "device identifier" may include any suitable indicia to identify a device. For example, a device identifier may include any series of characters, numbers, graphics, symbols, or other information that may be associated with an electronic device. Typically, a device identifier is utilized to uniquely identify the electronic device in order to initiate one or more functions remotely. For example, a network address may be an example of a device identifier that may be used to initiate one or more operations to be performed by the electronic device. In this example, an instruction to initiate the operation may be transmitted to the network address.

A "device layer" may include functional software that operates at a device level. In some embodiments, a device layer may be any execution environment of an electronic device configured to communicate with a service computer of a service computer and to execute programmatic instructions stored on the electronic device. In some embodiments, software in the device layer may be present in a secure execution environment such as a secure memory (e.g., smartcard-based technology available in low-power devices). In some embodiments, the device layer may be present in a secure storage (e.g., secure key storage). In some environments, a device layer may be an execution environment remote from the electronic device. For example, the electronic device may be a thin-client device configured to execute instructions provided as a result of processing performed at a remote server. In some embodiments, the device layer may be a virtual instance or virtual environment in a cloud-based system. For example, a performance evaluation executed from a virtual instance on a remote server may provide instructions to one or more components of the electronic device. In this example, the remote server may also be configured to receive data directly from one or more input sensors of the electronic device.

A "device valuation" may be an estimation of the value of a specific instance of an electronic device. For example, a device valuation may comprise an estimation of an amount of currency for which the electronic device would sell in an open market. In another example, a device valuation may comprise an estimate of a benefit that the electronic device may provide over its life. In some embodiments, the device valuation may be provided in order to estimate a fair purchase price of the electronic device. In some embodiments, a device valuation may provide an estimation of a recovery amount for an electronic device used as collateral to secure a credit extension. In some embodiments, the device valuation may include an upgrade value, or a difference in value between the current device and another version of the device. In some embodiments, the device valuation may be measured in units other than currency. In some embodiments, a device valuation may comprise an estimation of value with respect to another good or service (e.g., another electronic device). For example, one particular electronic device may be worth two of a different electronic device.

An "electronic marketplace" may be any virtual environment from which one or more products (goods and/or services) may be obtained. An electronic marketplace may comprise a website or other online presence maintained by a marketplace operator. In some embodiments, products that may be obtained from the electronic marketplace may be listed, or otherwise made available, via the electronic marketplace by one or more third party entities (entities unaffiliated with the marketplace operator). In some embodiments, an electronic marketplace may include a searchable database (or catalog) of product listings.

A "functionality assessment module" may be any set of instructions configured to, when executed by a processor, cause a performance evaluation for an electronic device to be initiated. For example, the functionality assessment module may be a software module stored on, and executed from, an execution environment of the electronic device. In this example, the functionality assessment module may cause one or more functions of the electronic device to be executed. Before, after, and/or during the execution of the one or more functions of the electronic device, the functionality assessment module may also cause one or more input sensors to collect data regarding the execution of the one or more functions of the electronic device. The functionality assessment module may be configured to analyze or otherwise process the collected data. In some embodiments, the functionality assessment module may comprise instructions implemented on an integrated circuit such as an application-specific integrated circuit (ASIC) chip or a field-programmable gate array (FPGA). In some embodiments, the functionality assessment module may comprise instructions implemented on a microcontroller or system on chip (SoC).

An "electronic device" may be any type of device operates using electricity. In some embodiments, the electronic device may have a primary function, or a function that most closely aligns with the electronic device's purpose. In some embodiments, the electronic device may have one or more secondary functions (functions other than the device's primary function). The electronic device may operate using instructions executed from a device layer.

"Model information" may include any information related to the particular instance of the electronic device. For example, the model information may include a model number or identifier, a year produced, a version, a base value of the electronic device, an original price (e.g., a retail price) of the electronic device, or any other suitable information that may be used to identify a specific type of the electronic device. In some embodiments, the model information may also include an age of the electronic device. In some embodiments, the model information may include an indication of any upgrades or other modifications made to the electronic device.

A "parameter value" may be any suitable value associated with a parameter of the execution of a performance evaluation on an electronic device. For example, upon the electronic device's execution of a performance evaluation, input sensors on the electronic device may collect input related to one or more executed functions. A parameter value may then be determined from the collected input by measuring a response of the electronic device during the execution of the function. In some embodiments, the parameter value may represent a level or intensity of an input detected over a period of time. In some embodiments, the parameter value may comprise a time for the electronic device to complete a particular function or task. By way of illustration, if a performance evaluation is being conducted on a water heater, a thermometer may be used to collect temperature information on water being heated by the water heater. In this example, a parameter value may represent the amount of time that the water heater takes to heat a full tank of water to a particular temperature. Another parameter value may represent the amount of energy expended by the water heater over a specified period of time to maintain a particular temperature. By way of a second illustration, if a performance evaluation is being conducted on an audio speaker, a microphone (input sensor) may be used collect information on sound output by the audio speaker. In this example, the parameter value may represent the collected audio information. In some embodiments, collected parameter values may be compared to expected values to determine a delta (e.g., an amount of variance). Further to this example, if a note at 8 decibels was expected from the audio speaker and a note at 6 decibels was detected, then the service computer may identify a delta of −2. In some embodiments, a parameter value may be an array, or series, of values.

A "performance evaluation" may be any operation that may assess the capabilities of an electronic device. For example, a performance evaluation may comprise the execution of one or more functions of an electronic device while collecting input related to the execution of that function. For example, the electronic device may execute a function while timing the execution of the function. In another example, the performance evaluation may comprise an execution of a function while collecting information on the amount of a resource consumed during the execution of the function. By way of non-limiting illustrative example, a performance evaluation may include determining a speed of a central processing unit (CPU) by performing operations to benchmark the CPU's performance against known and expected speeds; playing a sound through the electronic device's speaker system and using the electronic device's microphone to detect the sound in order to gauge its volume and clarity (to determine if the speakers of the electronic device are functioning or are "blown out"); testing an electronic device's ability to vibrate (in the example of a phone) by measuring the vibrations via an internal accelerometer; measuring the internal temperature of said device against the "set" temperature to ensure that the device is properly cooling or measuring the time it takes for the electronic device to reach the set temperature; and performing an on-board diagnostic system (OBD-II) diagnostic query on an accessible/addressable vehicle component. The performance evaluation itself may be device-specific, in that the parameters measured depend upon the type of electronic device being evaluated and its features/capabilities.

A "product listing" may be any listing of goods and/or services. In some cases, the goods and/or services may be available from a marketplace. The marketplace may comprise an electronic marketplace or a physical retail store. For example a product listing may comprise a catalog of goods currently being offered for sale on a retail website. A product listing may include various pieces of information related to a product to which the product listing is associated. For example, the product listing may include a picture of the product (or a stock image of the product), a description of the product, various specifications related to the product, a price at which the product is being offered, or any other suitable product-related information. In some embodiments, a product listing may comprise a network document (e.g., a website) that includes information related to a particular product. Such a network document may be stored in a directory maintained by a marketplace operator.

A "service layer" may be any suitable software module that operates at a service level. It may be present in an execution environment of a service computer configured to communicate with a device layer of an electronic device and can provide programmatic instructions to the electronic device. The service layer may be configured to receive a set of parameter values from the electronic device in response to initiating a performance evaluation. The service layer may be configured to generate a valuation in some embodiments of the invention.

A "service computer" or "service computer" may include any system associated with an entity that provides a resource or service. In some embodiments, the service computer may handle functionality of a computer application associated with the entity that provides the resource or service. The service computer may provide any suitable service. For example, the service computer may be a merchant, a utility company, a payment processing network, a wallet provider, a merchant, a website operator, or a bank.

FIG. 1 depicts an illustrative example of a system or architecture 100 in which techniques for implementing a device valuation functionality on an electronic device may be implemented. In architecture 100, an electronic device may include a device 102 configured to execute one or more functions of the electronic device. The depicted system may also include a service computer 104 in communication with the device 102 via one or more networks 106.

In some embodiments, the device 102 may be a machine that has included within it, the components 108, 110, 112, and 114 (which are described in detail below). For example, the device 102 may be a smart refrigerator that has included within its housing, processors 108, input sensors 110, output devices 112, and memories 114. In other embodiments, the components 108, 110, 112, 114 may reside outside of a housing of a particular machine such as an ordinary refrigerator that does not have smart functions or a processor. In such embodiments, the ordinary refrigerator and the processor 108, input sensors 110, output device 112, and memories 114 may still be considered a single device, even if the components of the device do not reside within a single housing.

The device 102 may include one or more processors 108 capable of processing user input. The device 102 may also include one or more input sensors 110 for receiving user input. As is known in the art, there are a variety of input sensors 110 capable of detecting user input, such as keyboards, mice, accelerometers, cameras, microphones, etc. The user input obtained by the input sensors may be from a variety of data input types, including, but not limited to, audio data, visual data, or biometric data. The device 102 may include an output device 112 configured to convey information to one or more users of the electronic device. An output device may comprise a speaker, a display device, or any other suitable means of communicating data to a user. Embodiments of the application on the device 102 may be stored and executed from its memory 114.

Turning to the contents of the memory 114 in more detail, the memory 114 may include a function execution module 116 configured to execute the electronic device's primary function. The memory 114 may also include a functionality assessment module 118 that is capable (in conjunction with the processor 108) of determining one or more parameter values to be associated with the electronic device. Although sample architecture 100 depicts a functionality assessment module 118 as being included in the contents of the memory 114 of the device 102, some embodiments may not include a functionality assessment module 118 in memory 114 of the device 102. In those embodiments in which the functionality assessment module 118 is not included in memory 114, the device 102 may be in communication with a functionality assessment module 118 executed from the service computer 104. For example, the device 102 may be in communication with the service computer 104, and may provide feedback to the service computer operating the service computer 104 in response to receiving instructions. In this example, the service computer 104 may communicate with the device 102 to execute the functionality assessment module 118 remotely.

In some embodiments, the function execution module 116 may be configured to initiate and/or execute a function of an electronic device. For example, the function execution module 116 may be configured to receive input from a user via the input sensors 110 and initiate a function specified in the received input. In some embodiments, the electronic device may be configured to perform one or more functions automatically. In some cases, the electronic device may not include a function execution module 116. By way of illustrative example, a refrigerator (an electronic device) may be configured to maintain a temperature (the function of the electronic device) without the use of a software module. In this example, the refrigerator may not include a function execution module.

In some embodiments, the functionality assessment module 118 may be configured to collect one or more parameter values associated with a function of the electronic device. Upon receiving an activation signal, the functionality assessment module 118 may comprise code for collecting input information from one or more input sensors. The input information may include data related to one or more parameter values associated with a function of the electronic device. In some embodiments, parameter values may be compared to threshold parameter values to determine one or more offset values. In some embodiments, the functionality assessment module 118 may comprise code for receiving an activation signal from the service computer 104. In some embodiments, the functionality assessment module 118 may comprise code for receiving an activation signal from a user device 120. In some embodiments, the collected parameter values may be provided to the service computer 104 for processing.

In some examples, the network(s) 106 may include any one or a combination of many different types of networks, such as cable networks, the Internet, wireless networks, cellular networks, and other private and/or public networks. In addition, the networks 106 may comprise multiple different networks. For example, the device 102 may utilize a wireless local area network (WLAN) to communicate with a wireless router, which may then route the communication over a public network (e.g., the Internet) to the service computer 104.

In accordance with at least some embodiments, the device 102 and/or the service computer 104 may be in communication with a user device 120. The user device 120 may enable a user to interact with either a device layer associated with the device 102 or a service layer associated with the service computer 104. For example, the user device 120 may be utilized to initiate the function execution module 116 and/or the functionality assessment module 118. The user device 120 may be any type of computing device such as, but not limited to, a mobile phone, a smart phone, a personal digital assistant (PDA), a laptop computer, a desktop computer, a server computer, a thin-client device, a tablet PC, etc. Additionally, user device 120 may be any type of wearable technology device, such as a watch, earpiece, glasses, etc. The user device 120 may include one or more processors capable of processing user input. The user device 120 may also include one or more input sensors for receiving user input.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
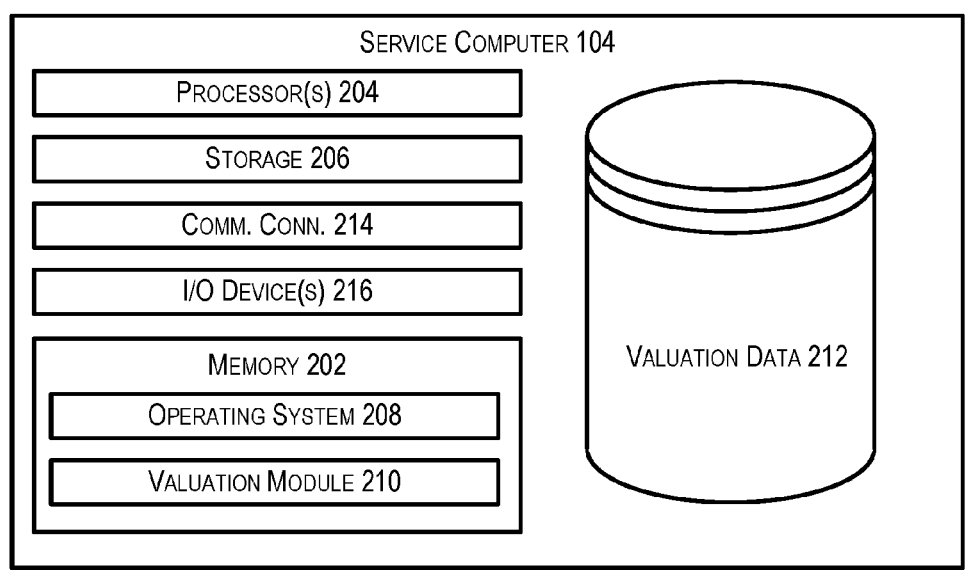
FIG. 2 depicts an illustrative example of a service computer capable of providing backend support for a device valuation platform in accordance with at least some embodiments.

FIG. 2 depicts an illustrative example of a service computer 104 capable of providing backend support for a device valuation platform in accordance with at least some embodiments.

The service computer may be any type of computing device including a remotely located server computer. Additionally, it should be noted that in some embodiments, the service computer 104 may be embodied by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service computer 104 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of service computer 104, the memory 202 may be volatile (such as random access memory (RAM)) and/or non-volatile (such as read-only memory (ROM), flash memory, etc.). The service computer 104 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the memory 202 may include multiple different types of memory, such as static random access memory (SRAM), dynamic random access memory (DRAM) or ROM. Turning to the contents of the memory 202 in more detail, the memory 202 may include an operating system 208 and one or more application programs or services for implementing the features disclosed herein including at least a module for determining a value associated with an electronic device (valuation module 210). The memory 202 may also include valuation data 212, which provides data associated with one or more valuation techniques.

The memory 202 and the additional storage 206, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 102 or the service computer 104. The service computer 104 may also contain communications connection(s) 214 that allow the service computer 104 to communicate with a stored database, another computing device or server, user terminals, and/or other devices on the network(s) 106. The service computer 104 may also include input/output (I/O) device(s) and/or ports 216, such as for enabling connection with a keyboard, a mouse, a pen, a voice input device, a touch input device, a display, speakers, a printer, etc.

Turning to the contents of the memory 202 in more detail, the memory 202 may include an operating system 208. A database containing valuation data 212 is shown and may also be incorporated into the memory 202 or a different memory. One or more application programs or services for implementing the features disclosed herein, including a valuation module 210, may also be stored in the memory 202. The valuation data 212 may comprise any suitable persistent data storage system. In some embodiments, the valuation data 212 may be stored in a database. Valuation information stored in the valuation database 212 may be accessed by the valuation module 210 via a database query or any other suitable data retrieval means.

In some embodiments, the valuation module 210 may, in conjunction with the processor 204, be configured to identify one or more valuation techniques associated with an electronic device and provide a valuation for the electronic device. In some embodiments, the valuation techniques may be identified based at least in part on a type of electronic device for which the valuation is being provided. In some embodiments, a valuation technique may be identified based on a third party entity (an entity unaffiliated with the electronic device and the service computer) for which the valuation is being provided. For example, if the electronic device will serve as collateral for a loan, then the valuation technique to be used may be identified by a loan officer. In another example, a third party entity may maintain a set of values for a device. For example, a third party entity may identify multiple values that may be associated with an electronic device based on a condition of the electronic device.

Upon identifying a valuation technique to be used for the electronic device, the valuation module 210 may comprise code for receiving one or more parameter values provided by a functionality assessment module 118 executed on the electronic device. Upon receiving the one or more parameter values, the valuation module 210 may, in conjunction with the processor 204, determine a value for the electronic device using the identified valuation technique, the received parameter values, and model information associated with the electronic device.

In some embodiments, a number of valuation techniques may be available to the valuation module 210. The valuation techniques available may include formulas, tables, references to electronic marketplaces, or any other suitable technique for assessing the value of a device. For example, the service computer 104 may maintain a formula to be used to value a particular electronic device. In some embodiments, each brand and/or model of the electronic device may be valued according to a different formula. In this example, variables in the formula may be replaced by the received parameter values in order to calculate the value of the electronic device. In another example, the service computer may maintain a table of values, where a condition of the electronic device (estimated based on the received parameter values) is associated with a particular value. In yet another example, the service computer 104 may maintain a link to an electronic marketplace. In this example, the service computer may identify the last sale price of an electronic device with similar parameter values as the value of the device.

In some embodiments, parameter values may be provided to the valuation module by the electronic device to be evaluated. Parameter values may be collected using input sensors attached to the electronic device. The parameter values to be received may be defined in instructions included with the performance evaluation. For example, instructions for performing the performance evaluation may include an indication of functions to be executed as well as input sensors to be activated and values to be collected from those input sensors during execution of the functions. In this example, the parameter values may be associated with a performance of the electronic device.

In some embodiments, model information associated with the electronic device may be stored at the service computer 104 (e.g., in valuation data 212). The model information may include a base value, instructions for the performance evaluation, and/or expected parameter values associated with the electronic device to be valued. For example, each brand, model, and version of the electronic device may have a separate base value, performance evaluation, and set of expected parameter values associated with it.

In some embodiments, the valuation data 212 may comprise valuation information to be associated with various electronic devices. In some embodiments, the valuation data may comprise one or more formulae to be associated with the electronic device. For example, the valuation data may include a formula that may be used to calculate a maximum value for a particular brand and model of an electronic device. The formula may take, as input, one or more variables representing an age of the electronic device, a condition of the electronic device, one or more parameter values for the electronic device, and/or any other suitable data.

Figure 3:
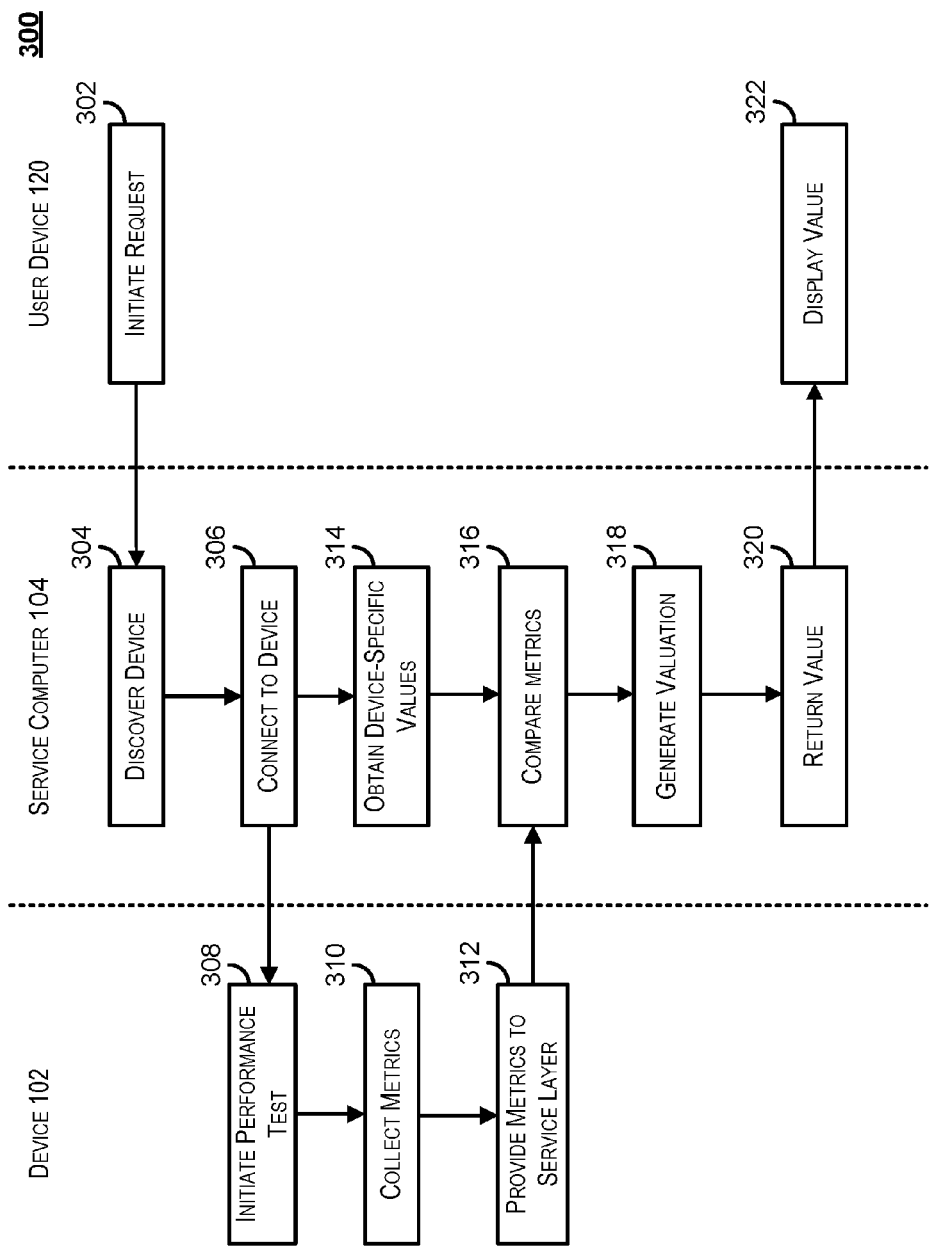
FIG. 3 depicts a process flow for collecting parameter values and generating a valuation for an electronic device in accordance with at least some embodiments.

FIG. 3 depicts a process flow for collecting parameter values and generating a valuation for an electronic device in accordance with at least some embodiments. FIG. 3 depicts interactions between a device 102, a service computer 104, and a user device 120. Each of the device 102, the service computer 104 and the user device 120 are described above in FIG. 1.

In FIG. 3, a request may be initiated at 302. In some embodiments, the request may be initiated by a user device 120. In some embodiments, the request may be initiated by the service computer 104. In some embodiments, the service computer 104 may receive an indication of the device for which a valuation is to be generated. At 304, the service computer 302 may perform a device discovery process to identify the indicated device. In some embodiments, the indicated device may be located at an internet protocol (IP) address. Once the device has been discovered, the service computer 104 may connect to the device at 306.

Once connected, the service computer 104 may cause the device 102 to initiate a performance evaluation of the device at 308. In some embodiments, the initiation of a performance evaluation may activate one or more input sensors capable of collecting data metrics from the device 102. The data metrics may be related to the functionality of the device 102. For example, the performance evaluation may collect information on how well the device 102 performs one or more functions. The device 102 may collect data metrics at 310. In some embodiments, the device 102 may provide the data metrics to the service computer 104 at 312 as a set of parameter values.

The service computer 104 may obtain device-specific values at 314. For example, the service computer 104 may query a valuation database to identify a set of expected values (e.g., values that would be expected from a fully functional version of the electronic device). In some embodiments, the service computer 104 may also obtain a valuation technique for the device. For example, the service computer may obtain a formula for assessing a base value for the device. In some embodiments, the service computer 104 may maintain a table of potential values, wherein entries within the table may be organized by condition, age, or any other suitable factor. In some embodiments, the base value may be a maximum value, an average value, or a minimum value for the device. In some embodiments, the service computer 104 may maintain a depreciation function and an expected useful life for the device that may be used to calculate a base value. For example, the device may be associated with a linear depreciation function with respect to time and may be given a specified useful life. In this example, a valuation for the device may be calculated as $$V_B = ([U-t]/U) * V_I$$

In this example, $V_B$ is the current base value of the device, $V_I$ is the initial value of the device (the value when new), U is the useful life of the device, and t is the age of the device. In some embodiments, the depreciation function may be tied to one or more accounting principles used to assess a value for the device. For example, the depreciation function may be determined based on an accounting principle maintained in a Statement of Financial Accounting Standards (SFAS) or an American Institute of Certified Public Accountants (AICPA) Statement of Position (SOP).

In some embodiments, the service computer 104 may maintain one or more valuation techniques determined using a machine learning algorithm, including algorithms that use workforce auditing (such as crowdsourcing platforms). In these embodiments, one or more machine learning and/or pattern recognition techniques may be used to identify a formula that is best able to predict a value of the device. For example, one or more machine learning algorithms may be trained on past valuation data for a device. In this example, if the device is sold, the actual sale price data for the device may be used to provide feedback for the machine learning algorithms.

In some embodiments, the service computer 104 may compare the set of parameter values provided by the device 102 to those of the obtained device-specific values at 316. In some embodiments, the service computer 104 may generate a valuation for the device at 318. For example, the service computer 104 may identify a base value for the device and adjust the value based on the difference between the set of parameter values and the device-specific values. The adjusted value may be returned to the user device at 320 and subsequently displayed by the user device 120 at 322.

Figure 4:
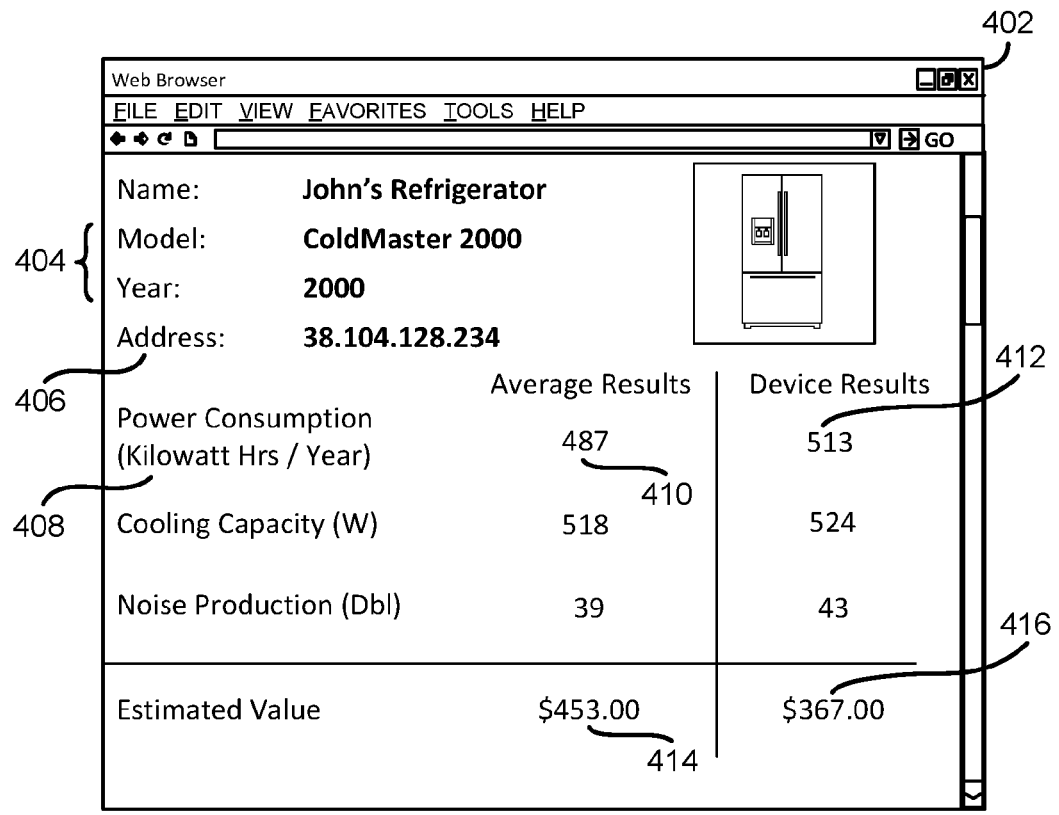
FIG. 4 depicts an illustrative example of a user interaction in accordance with at least some embodiments.

FIG. 4 depicts an illustrative example of a user interaction in accordance with at least some embodiments. FIG. 4 depicts an instance of a web browser 402 utilized to access a device valuation platform. In some embodiments, a user may access information provided by a service computer via the web browser 402. In some embodiments, the service computer may maintain a plurality of user accounts associated with a plurality of users. In some embodiments, a user account may be accessed using a username and/or password.

In some embodiments, a user account may be associated with one or more electronic devices. In some embodiments, the service computer may maintain one or more model information 404 associated with an electronic device. In some embodiments, the model information 404 may be provided by a user via the web browser 402. In some embodiments, the service computer may store a device identifier 406 in association with the electronic device. For example, a device identifier may be a network address, a phone number, a serial number, or any other suitable means of identifying/locating the electronic device. In some embodiments, the device identifier 406 may be provided by a user via the web browser 402. The service computer may initiate a performance evaluation of the electronic device using the device identifier 406. For example, the service computer may transmit an instruction to initiate a performance evaluation to a specified network address.

In some embodiments, the service computer may maintain a set of device-specific parameters 408. In some embodiments, the device-specific parameters may be stored with respect to a type of device. For example, each electronic device may be associated with a category of item, which may subsequently be associated with a set of device-specific parameters. In some embodiments, a device may belong to multiple categories. In some embodiments, a device may belong to a sub-category, which may be associated with additional device-specific parameters. A sub-category may inherit each of the device-specific parameters of its parent category as well as one or more additional parameters. For example, a particular model of laptop computer may belong to a "laptop" category, which may be a sub-category of a "computer" category. In the provided example, the laptop category may include each of the device-specific parameters included in the computer category as well as one or more parameters related to a screen display.

In some embodiments, the service computer may maintain one or more "expected" or average values 410 for each of the set of device-specific parameters with respect to a particular model of the electronic device. In addition, the service computer may receive a set of parameter values 412 from the electronic device itself. The set of parameter values 412 may be received from the electronic device in response to initiating a performance evaluation. In some embodiments, the average values 410 may be calculated from a number of parameter values received by the service computer over multiple tests. In some embodiments, the average values 410 may be provided by a third party entity (an entity unaffiliated with the service computer). For example, the average values may be provided by a manufacturer of the electronic device.

Upon receiving a set of parameter values from the electronic device, the service computer may identify a base value 414 for that model of the electronic device. The base value 414 may then be used to generate a valuation 416 of the electronic device by being adjusted to account for the differences in functionality exhibited during the performance evaluation. In some embodiments, the base value may be adjusted upwards or downwards based on the parameter values provided by the performance evaluation to generate a valuation. In some embodiments, the base value may act as a maximum value, such that it may only be adjusted downwards to generate a valuation of the device. The valuation 416 of the electronic device may be generated from the base value 414 using a number of techniques. The service computer may maintain a valuation formula to be used with respect to the particular model or category associated with the electronic device. In some embodiments, the service computer may assign various weights to each device-specific parameter in the set of device-specific parameters.

In some embodiments, the service computer may maintain a table of base values. For example, a table may comprise columns representing an age of the device and rows representing a condition of the device. The service computer may identify a condition of the electronic device from the provided parameter values and identify a base value based on the age of the electronic device. Although this specific illustration is described with respect to a table of base values, a table which includes other column and row values should be considered an equivalent. For example, a table may be maintained with estimated values for devices in "Excellent," "Very Good," "Good," "Fair" or "Poor" conditions. In this example, the service computer may determine which condition the electronic device is in based on the received parameter values and assign the corresponding value to the electronic device.

By way of illustrative example, consider the scenario in which the electronic device is a refrigerator. In this example, the service computer may maintain a set of device-specific parameters for the category "refrigerators." The service computer may also maintain a set of average values for the specific model of refrigerator in the scenario, wherein each of the average values corresponds to a device-specific parameter. In this illustrative example, the refrigerator for which the valuation is being provided may provide a set of parameter values that result from a performance evaluation run on the refrigerator. Each of the provided parameter values may also correspond to the device-specific parameters. The service computer may compare each of the parameter values to its corresponding average value to determine whether the refrigerator is functioning at a level above or below that of an average refrigerator of that same model. The service computer may then identify a base value for that model of the refrigerator (a value associated with an average refrigerator of that model). The service computer may subsequently adjust the base value to account for the differences in functionality exhibited during the performance evaluation. The adjusted base value may then be presented as a valuation for the particular refrigerator.

Figure 5:
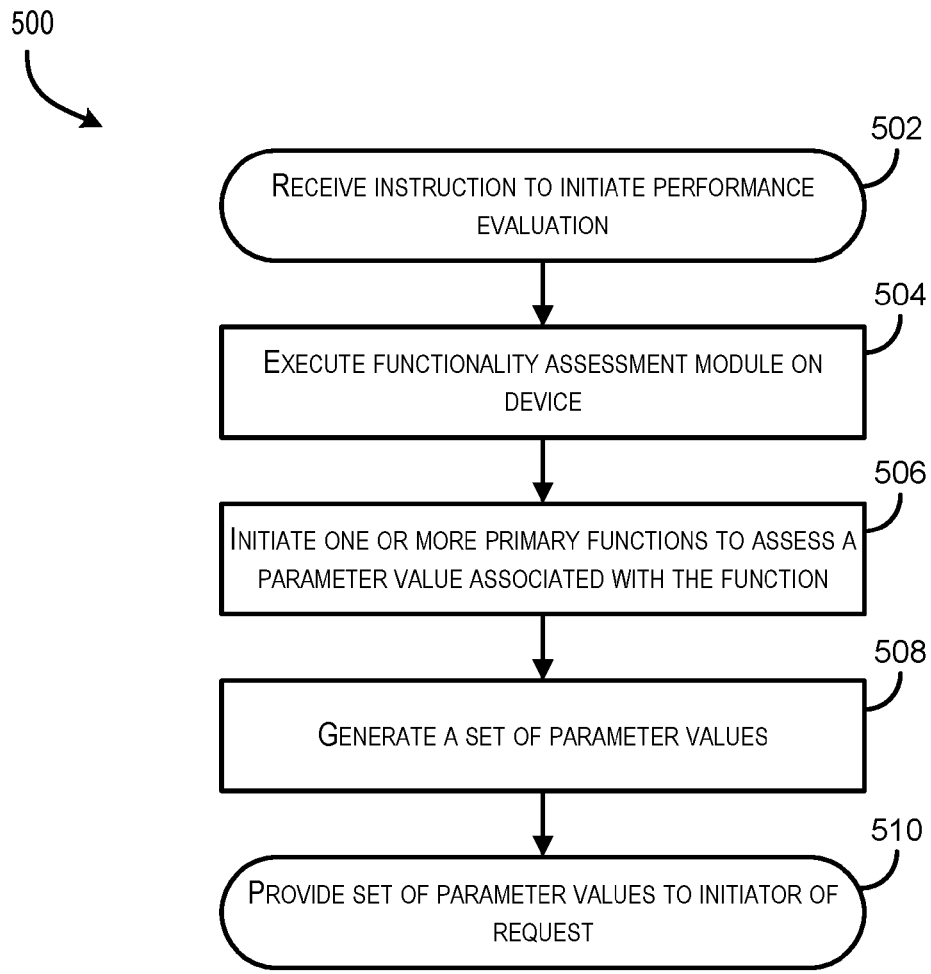
FIG. 5 depicts a process for executing a functionality assessment with respect to an electronic device in accordance with at least some embodiments.

FIG. 5 depicts a process for executing a functionality assessment with respect to an electronic device in accordance with at least some embodiments. The process 500 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 500 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 500 of FIG. 5 may be performed by at least the device 102 depicted in FIG. 1. The code may be stored on a computer-readable storage medium, for example, in the form of a computer program including a plurality of instructions executable by one or more processors. The computer-readable storage medium may be non-transitory.

Process 500 may begin at 502, when an instruction is received by a device to initiate a performance evaluation. In some embodiments, instructions for executing the performance evaluation may be stored in a memory of the device. In some embodiments, the performance evaluation may be carried out by a functionality assessment module implemented on the electronic device, as described with respect to FIG. 1 above. The functionality assessment module on the device may be executed at 504.

In accordance with the performance evaluation, the functionality assessment module may initiate one or more primary functions to assess a parameter value associated with the function at 506. The performance evaluation may specify a number of actions to be performed. For example, the performance evaluation may specify an order in which particular functions should be tested, a time period over which a function is to be tested, an intensity or level of power at which to test a function, or any other suitable functionality testing criteria.

Upon executing the performance evaluation, one or more input sensors may be used to collect input from the electronic device. The input collected may be used to generate a set of parameter values at 508. The set of parameter values to be generated may be specified in instructions stored in the memory of the electronic device. For example, input may be collected by an input sensor. In this example, the input collected may be translated into a data value and stored as a parameter value. Once a set of parameter values has been generated, the set of parameter values may be provided to the initiator of the request at 510.

In some embodiments, the process 500 may be performed without human intervention. For example, the performance evaluation may not require that a user of the electronic device be present or take any action. In some embodiments, the performance evaluation may be initiated remotely by a service computer. In some embodiments, the performance evaluation may be initiated on a periodic basis. In some embodiments, the performance evaluation may be initiated on specified dates.

Figure 6:
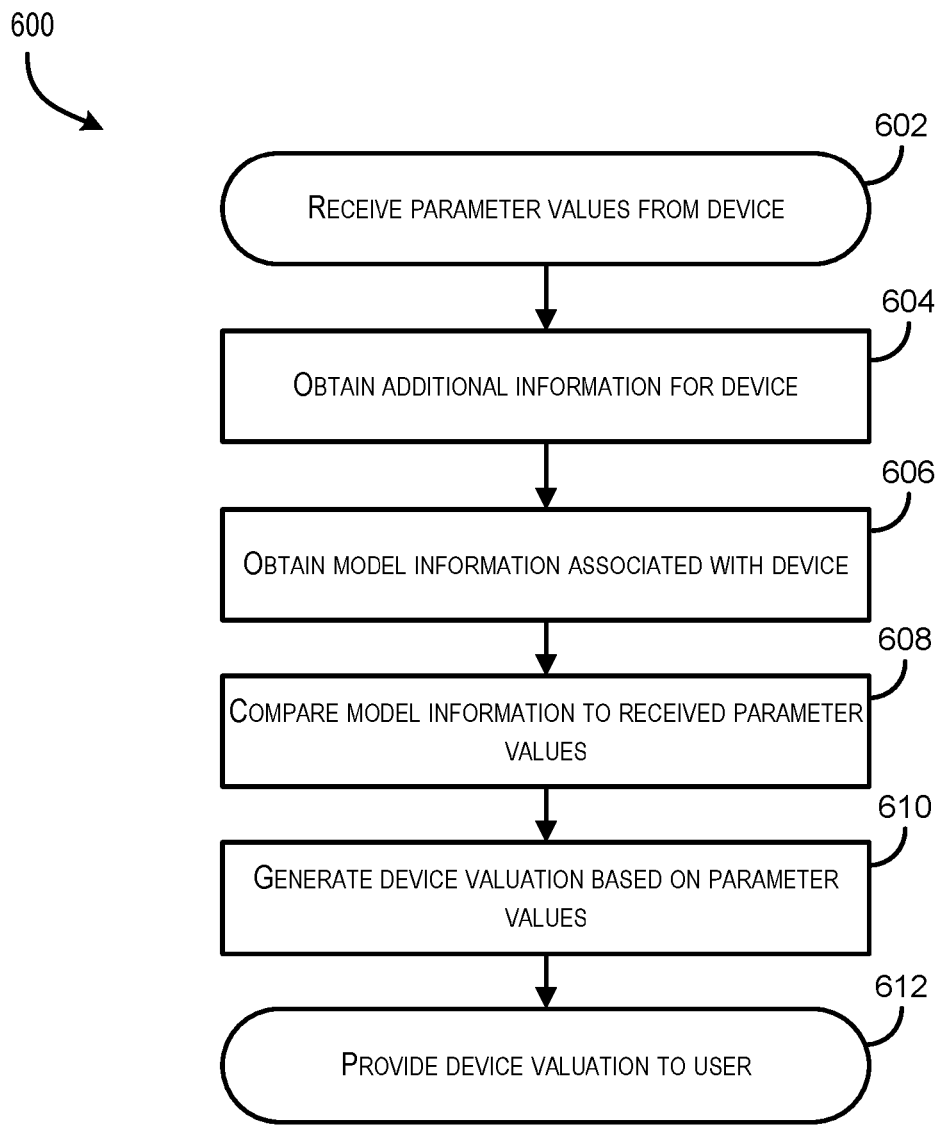
FIG. 6 depicts a process for applying one or more valuation techniques to a set of performance metrics in accordance with at least some embodiments.

FIG. 6 depicts a process for applying one or more valuation techniques to a set of performance metrics in accordance with at least some embodiments. Some or all of the process 600 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by at least the service computer 104 depicted in FIG. 1. The code may be stored on a computer-readable storage medium, for example, in the form of a computer program including a plurality of instructions executable by one or more processors. The computer-readable storage medium may be non-transitory.

Process 600 may begin at 602, when parameter values are received from an electronic device. In some embodiments, the service computer may obtain additional information related to the electronic device at 604. For example, the service computer may determine an age of the electronic device. In another example, the service computer may identify one or more upgrades, add-ons, or additional features. In some embodiments, the service computer may identify a value associated with each of the identified additional information.

In some embodiments, the service computer may obtain model information associated with the electronic device at 606. The model information may include an indication of a model number or identifier, a year produced, a version, or any other suitable information that may be used to identify a specific type of the electronic device. The model information may also include a method of generating a base value for the electronic device. For example, the model information may include a formula to be used in calculating a base value for the electronic device. The service computer may generate a base value for the electronic device based on the model information. The model information may also include model-specific specification values. For example, the model information may include a number of expected values associated with various functionalities of the electronic device.

At 608, the service computer may compare the specification values included in the model information to the received parameter values. The service computer may calculate a value adjustment based on a difference between the received parameter values and the identified specification values. The service computer may then generate a device valuation at 610. In some embodiments, the device valuation may be generated by adding the adjustment value to the determined base value. In some embodiments, the service computer may provide the device valuation to user at 612.

Figure 7:
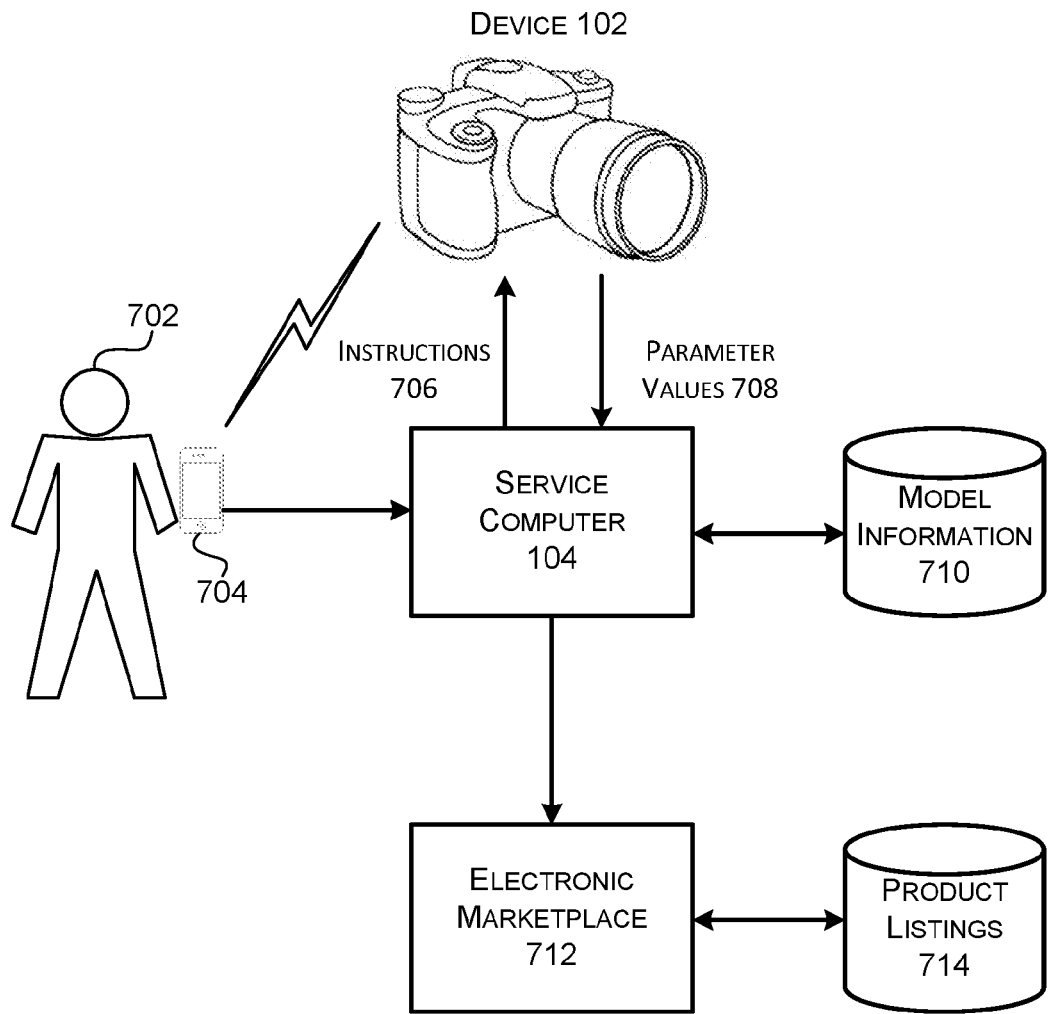
FIG. 7 depicts an illustrative example process in which a product listing is generated for a device 102 in an electronic marketplace in accordance with at least some embodiments.

FIG. 7 depicts an illustrative example process in which a product listing is generated for a device 102 in an electronic marketplace in accordance with at least some embodiments. In some embodiments, the example process may be initiated by a user 702 via a mobile device 704. The mobile device 704 may be in communication with the device 102 and/or a service computer 104. The mobile device 704 may initiate the process via a web browser, mobile application, or any other suitable software module. In some embodiments, the example process may be initiated without the use of a mobile device. For example, the device 102 may have a button or other activation mechanism that, when activated, causes the device 102 to initiate the process described. In some embodiments, the process may result in the device 102 being offered for sale on one or more electronic marketplaces without further user intervention.

Upon receiving a request from the mobile device, the service computer 104 may cause an initiation of a performance evaluation of the device 102. The service computer 104 may send instructions 706 to the device 102 to initiate the performance evaluation. Upon execution of the performance evaluation as described above, the device 102 may collect a set of parameter values 708 which it may provide to the service computer 104. Upon receiving the set of parameter values 708, the service computer may query a database of model information 710 in order to identify device specifications (or expected parameter values) for the device 102. The service computer 104 may determine a valuation for the device 102 based on the identified specifications and the received set of parameter values 708. In some embodiments, the service computer 104 may query the model information 710 for an image of the device 102 (e.g., a stock photo).

The service computer 104 may be in communication with an electronic marketplace 712 or a marketplace operator operating an electronic marketplace 712. The electronic marketplace 712 may comprise a number of product listings 714, each associated with a different device. In some embodiments, the electronic marketplace 714 may be dedicated to a particular type of device. In some embodiments, the valuation generated by the service computer 104 may be generated based on similar devices listed in the set of product listings 714. In some embodiments, the service computer may be owned and/or operated by a marketplace operator.

The service computer 104 may generate a product listing formatted in accordance with the set of product listings 714 maintained by the electronic marketplace 712. The generated product listing may include an image of the device 102, a description related to the device 102, one or more of the parameter values 708, and/or any suitable device-related information. The product listing may include a price based on the determined device valuation. The product listing for the device 102 may be generated without user interaction.

In some embodiments, upon creation of the product listing, the service computer 104 may provide the product listing to the electronic marketplace 712 to be added to the set of product listings 714. In some embodiments, upon creation of the product listing, the service computer 104 may provide the product listing to the user device 704 for approval prior to adding the product listing to the set of product listings 714.

By way of illustrative example, consider a scenario in which a user wishes to sell his digital camera (device 102). In this scenario, the user may indicate to the service computer that the camera is to be sold on a particular electronic marketplace. The service computer may establish a communication session with the camera and provide instructions for executing a performance evaluation. Upon receiving these instructions, the camera may initiate one or more of its functions and collect data on the performance of those functions. The collected data related to the performance of the camera's functions may then be provided to the service computer as a set of parameter values. Once the service computer has received the set of parameter values from the camera, the service computer may generate a valuation for the camera based on the parameter values and model information related to the camera. The service computer may then generate a product listing for the camera that is formatted based on specifications of the particular electronic marketplace that the user wishes to sell the camera on. Once the product listing has been generated, it may be added as a listing to the electronic marketplace. In this way, the user need only initiate the process and his camera will be offered for sale without any further interaction on his part.

Although FIG. 7 depicts an example in which a performance evaluation has been performed and a device valuation has been generated, it should be noted that some embodiments of the disclosure may not include a performance evaluation and/or the generation of a device valuation. For example, in some embodiments, the electronic device may be caused to provide at least some portion of model information to the service computer, with which it may query the model information database for additional model information. In this example, the service computer may generate a product listing for the electronic device based on the model information. In some embodiments, the product listing may be silent as to the offer price or valuation (e.g., the product listing may be listed on an auction electronic marketplace). In some embodiments, the service computer may generate a product listing with an offer price that represents an average price at which similar items are being sold.

Figure 8:
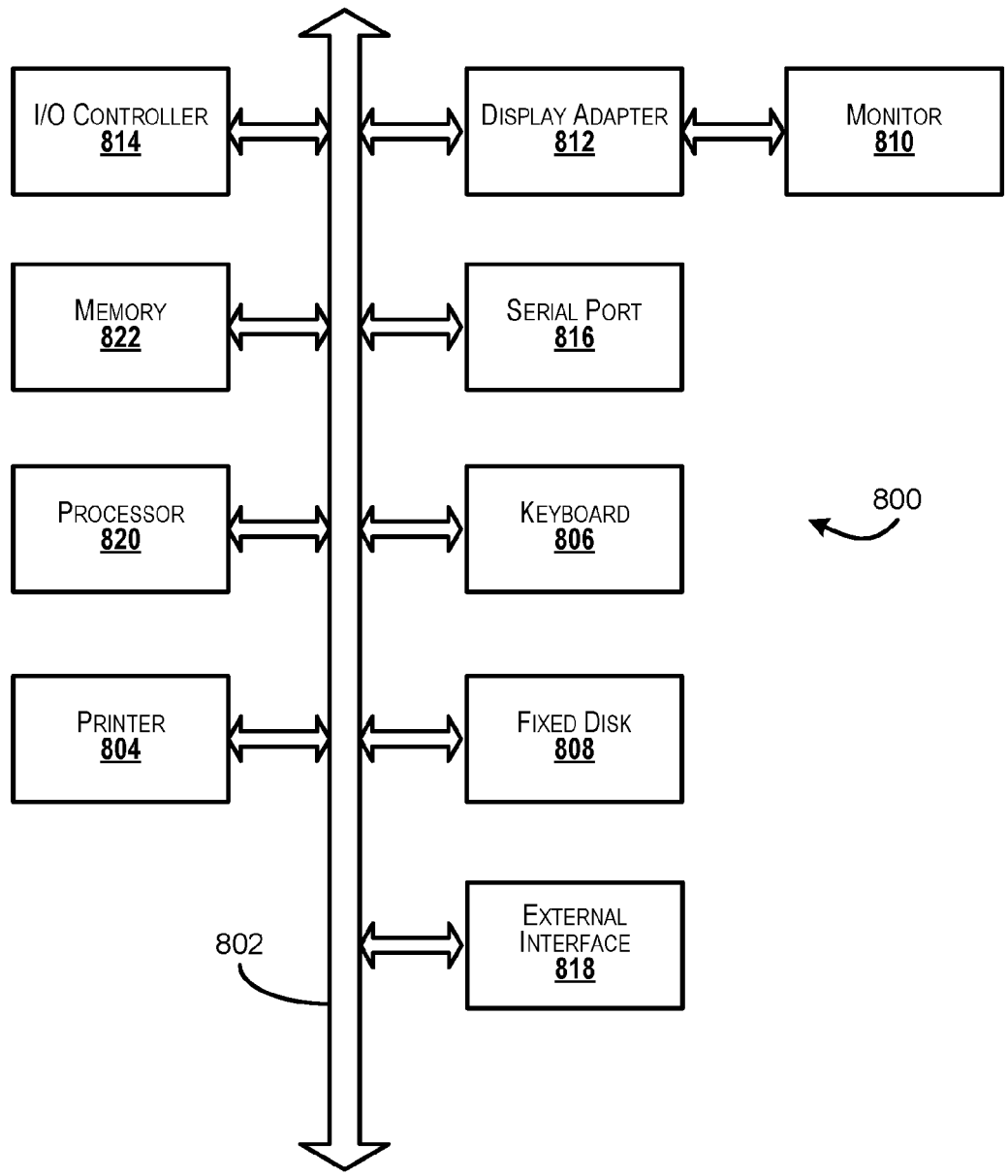

In accordance with at least some embodiments, the system, apparatus, methods, processes and/or operations for valuing a device based on functionality metrics may be wholly or partially implemented in the form of a set of instructions executed by one or more programmed computer processors such as a central processing unit (CPU) or microprocessor. Such processors may be incorporated in an apparatus, server, client or other computing device operated by, or in communication with, other components of the system. As an example, FIG. 8 depicts aspects of elements that may be present in a computer device and/or system 800 configured to implement a method and/or process in accordance with some embodiments of the present invention. The subsystems shown in FIG. 8 are interconnected via a system bus 802. Additional subsystems include a printer 804, a keyboard 806, a fixed disk 808, and a monitor 810, which is coupled to a display adapter 812. Peripherals and input/output (I/O) devices, which couple to an I/O controller 814, can be connected to the computer system by any number of means known in the art, such as a serial port 816. For example, the serial port 816 or an external interface 818 can be utilized to connect the computer device 700 to further devices and/or systems not shown in FIG. 8 including a wide area network such as the Internet, a mouse input device, and/or a scanner. The interconnection via the system bus 802 allows one or more processors 820 to communicate with each subsystem and to control the execution of instructions that may be stored in a system memory 822 and/or the fixed disk 808, as well as the exchange of information between subsystems. The system memory 822 and/or the fixed disk 808 may embody a tangible computer-readable medium.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Embodiments of the invention provide for a number of technical advantages. For example, embodiments of the invention add economic efficiency and functionality to an otherwise inefficient process and market. For example, users are more easily able to assess the value of an electronic device being sold in an electronic marketplace by comparing the electronic device to those similarly situated. Embodiments of the invention also enable a user to cause an electronic device to offer itself for sale on one or more electronic marketplaces without user interaction. This provides an technical advantage in that users are able to acquire a fair market value for the device without undue hardship and with minimum effort on their behalf. Additionally, this allows for a more transparent transaction, by enabling both the seller and buyer of the electronic device to understand the capabilities of the device. For example, it enables a seller to offer "representations and warranties" as to the functionality of a device, as the representations and warranties can reflect the result of the performance test, thus eliminating the need to sell electronic assets "as is" on electronic commerce web sites. Accordingly, purchasers of an electronic device are better able to assess the actual capabilities of the electronic device when a performance evaluation may be performed. This is an improvement over prior art systems, in which a user is only able to ascertain a physical condition of an electronic device to be purchased. In another example, a credit agency may be more willing to extend credit that is secured using an electronic device as collateral if the functionality of the electronic device may be assessed remotely.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method of assessing an electronic device, the method comprising:
   receiving a request for a device valuation associated with the electronic device;
   obtaining a model information for the electronic device;
   causing execution of a device-specific performance evaluation upon a hardware component contained within said electronic device;
   generating a set of parameter values based upon the execution of said device-specific performance evaluation; and
   determining an assessment of the electronic device based at least in part on the generated set of parameter values and the model information, wherein the assessment of the electronic device is determined by calculating a difference in value based on one or more differences between the generated set of parameter values and the model information.

2. The method of claim 1, further comprising transmitting over a network, the model information, the set of parameter values, or the assessment of the electronic device.

3. The method of claim 1, wherein the assessment is determined by an entity remote to the electronic device.

4. The method of claim 1, further comprising providing information related to the electronic device to a third party entity, the information related to the electronic device including a valuation of the electronic device based at least in part on the assessment.

5. The method of claim 1, wherein the method of assessing the electronic device is performed without user intervention.

6. The method of claim 1, wherein the model information comprises a model number, a hardware inventory list, or an expected result of a performance evaluation.

7. An electronic device comprising:
   at least one input sensor;
   a processor; and
   a memory including instructions that, when executed with the processor, cause the electronic device to, at least:
      execute a performance evaluation to obtain one or more parameter values associated with a performance of the electronic device;
      obtain specification values associated with the electronic device;
      determine, by comparing the one or more parameter values to the specification values, a value adjustment; and
      generate a device valuation for the electronic device based at least in part on the value adjustment, wherein the device valuation is generated by adding the value adjustment to a base value indicated in the specification values.

8. The electronic device of claim 7, wherein the base value is determined from a table of base values based on the specification values.

9. The electronic device of claim 8, wherein the base value is determined using one or more valuation formulae.

10. The electronic device of claim 7, wherein executing the performance evaluation comprises activating one or more functions of the electronic device.

11. The electronic device of claim 10, wherein the instructions further cause the electronic device to monitor one or more metrics related to the one or more functions of the electronic device during its activation.

12. The electronic device of claim 7, wherein the specification values includes at least an expected set of values, the value adjustment made based at least in part on a difference between the expected set of values and the one or more parameter values.

13. The electronic device of claim 7, wherein the specification values associated with the electronic device are obtained from a third party entity.

14. A method comprising:
   receiving a request to provide a device valuation associated with an electronic device;
   obtaining a model information associated with the electronic device;
   sending an instruction to the electronic device to initiate a performance evaluation;
   receiving, from the electronic device, a set of parameter values associated with a functionality of the electronic device;
   identifying a base value for the electronic device based on the model information; and
   determining, based at least in part on the received set of parameter values, the device valuation by adjusting the base value based on the set of parameter values.

15. The method of claim 14, further comprising:
   generating a product listing for the electronic device, the product listing including the device valuation.

16. The method of claim 15, further comprising posting the product listing to an electronic marketplace, the product listing representing an offer to sell the electronic device.

17. The method of claim 14, wherein the device valuation is also determined based on a base value that represents an average value associated with the electronic device.

18. The method of claim 14, wherein the model information associated with the electronic device is obtained from a third party entity.

19. The method of claim 14, wherein the device valuation comprises a determination based on an upgrade, add-on, modification, or additional feature made to the electronic device.

20. The method of claim 14, wherein the method is performed by a service computer without user interaction.

* * * * *